US 11,315,730 B2

(12) United States Patent
Ishibe et al.

(10) Patent No.: US 11,315,730 B2
(45) Date of Patent: Apr. 26, 2022

(54) MULTILAYER ELECTRONIC COMPONENT

(71) Applicant: Murata Manufacturing Co., Ltd., Nagaokakyo (JP)

(72) Inventors: Kiyoshiro Ishibe, Nagaokakyo (JP); Daisuke Hamada, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 0 days.

(21) Appl. No.: 16/983,411

(22) Filed: Aug. 3, 2020

(65) Prior Publication Data

US 2021/0043380 A1 Feb. 11, 2021

(30) Foreign Application Priority Data

Aug. 7, 2019 (JP) .................. JP2019-145001

(51) Int. Cl.
*H01G 4/12* (2006.01)
*H01G 4/232* (2006.01)
*H01G 4/30* (2006.01)

(52) U.S. Cl.
CPC ......... *H01G 4/1227* (2013.01); *H01G 4/2325* (2013.01); *H01G 4/30* (2013.01)

(58) Field of Classification Search
None
See application file for complete search history.

(56) References Cited

U.S. PATENT DOCUMENTS 9,478,357 B2 * 10/2016 Wada .................. H01G 4/012
9,536,668 B2 * 1/2017 Shimada ............. H01G 4/1227
2006/0213604 A1 * 9/2006 Fukui .................. C04B 35/638
156/89.14
2010/0214717 A1 * 8/2010 Nakamura .......... C04B 35/4682
361/303
2013/0250478 A1 9/2013 Kim et al.
2013/0258548 A1 * 10/2013 Mizuno ................ H01G 4/1227
361/301.4
2014/0009868 A1 * 1/2014 Yamaguchi ....... C04B 35/62685
361/321.4
2014/0347783 A1 * 11/2014 Kisumi .................. H01G 4/012
361/301.4

(Continued)

FOREIGN PATENT DOCUMENTS

JP 2005194138 A 7/2005
JP 2018182128 A 11/2018

(Continued)

OTHER PUBLICATIONS

Korean Office Action issued for corresponding Korean Patent Application No. 10-2020-0090875, dispatch date Jan. 20, 2022.

*Primary Examiner* — Dion R. Ferguson
(74) *Attorney, Agent, or Firm* — ArentFox Schiff LLP (57) ABSTRACT

A multilayer electronic component having an electrode facing portion in which a plurality of internal electrode layers face one another with a dielectric layer interposed therebetween. Each dielectric layer includes Ba, Ti, Si, Re, and M. M is at least one element selected from Mn, Ni, Co, Fe, Cr, Cu, Mg, Li, Al, Mo, W, and V. When the Ti is represented in an amount of 100 parts by mole the dielectric layer at the electrode facing portion has Si in an amount a of $0.01 \leq a \leq 0.1$, Re in an amount b of $0.1 \leq b \leq 3.0$, and M in an amount c of $0.2 \leq c \leq 5.0$. A ratio m of the amount of Ba to the amount of Ti is $0.965 \leq m \leq 0.990$.

12 Claims, 3 Drawing Sheets

(56) References Cited

U.S. PATENT DOCUMENTS

| | | | |
|---|---|---|---|
| 2015/0036262 A1* | 2/2015 | Kai | H01G 4/1209 |
| | | | 361/301.4 |
| 2015/0299047 A1* | 10/2015 | Yoon | H01G 4/1227 |
| | | | 361/301.4 |
| 2016/0181016 A1* | 6/2016 | Koga | H01G 4/2325 |
| | | | 361/301.4 |
| 2016/0217923 A1* | 7/2016 | Park | C04B 35/638 |
| 2017/0018358 A1* | 1/2017 | Isota | C04B 35/49 |
| 2017/0186537 A1* | 6/2017 | Park | H01G 4/0085 |
| 2018/0182549 A1* | 6/2018 | Koide | C04B 35/638 |
| 2018/0294097 A1* | 10/2018 | Ono | H01G 4/008 |
| 2018/0301282 A1 | 10/2018 | Nishikawa et al. | |
| 2019/0279817 A1* | 9/2019 | Park | C01G 23/00 |
| 2020/0111616 A1* | 4/2020 | Choi | B32B 18/00 |
| 2020/0251242 A1* | 8/2020 | Kwon | H01B 3/12 |

FOREIGN PATENT DOCUMENTS

| | | |
|---|---|---|
| KR | 20130106569 A | 9/2013 |
| KR | 20170009742 A | 1/2017 |

* cited by examiner

MULTILAYER ELECTRONIC COMPONENT

CROSS REFERENCE TO RELATED APPLICATIONS

The present application claims priority to Japanese Patent Application No. 2019-145001, filed Aug. 7, 2019, the entire contents of which are incorporated herein by reference.

BACKGROUND OF THE INVENTION

Field of the Invention

The present disclosure relates to a multilayer electronic component.

Description of the Background Art

Multilayer electronic components such as multilayer ceramic capacitors have increasingly been applied to electronic devices such as in-vehicle devices required to have high reliability. The term "reliability" as referred to in the present specification shall refer to a length of time for which insulation resistance decreases to a predetermined value in highly accelerated life testing (hereinafter also referred to as highly accelerated life). An example of the multilayer electronic component is a multilayer ceramic capacitor described in Japanese Patent Laying-Open No. 2005-194138.

SUMMARY OF THE INVENTION

In Japanese Patent Laying-Open No. 2005-194138, when the amount of each element included in a dielectric layer is represented in parts by mole the amount of each element is defined with the amount of Ti as 100. That is, the ratio of the total amount of Ba and Ca to the amount of Ti is 0.990 to 1.030, the amount of Re as a rare earth element is 0.050 to 2.5, and the amount of Si is 0.20 to 8.0. In Japanese Patent Laying-Open No. 2005-194138, high reliability is ensured by adjusting the amount of each element constituting the dielectric layer.

A multilayer ceramic capacitor includes a multilayer body in which dielectric layers and internal electrode layers are alternately stacked. As a result of an intensive study by the present inventors, it has been found that when the amount of Si in the dielectric layer is a large amount, the dielectric layer is deformable at high temperature. That is, when the internal electrode layer is excessively sintered during firing of the multilayer body and has a locally increased thickness, the dielectric layer is deformed correspondingly, and the thickness of the dielectric layer may decrease at a portion where the thickness of the internal electrode layer is increased. The same may occur when the fired multilayer body is subjected to a heat treatment at a high temperature. Such a local reduction in thickness of the dielectric layer may reduce reliability when the dielectric layer is further reduced in thickness.

An object of the present disclosure is to provide a multilayer electronic component capable of suppressing deformation of a dielectric layer at a high temperature and ensuring high reliability.

A multilayer electronic component according to the present disclosure includes a multilayer body including a plurality of stacked dielectric layers and a plurality of internal electrode layers between adjacent dielectric layers of the plurality of stacked dielectric layers. The dielectric layers includes Ba, Ti, Si, Re, and M as elements thereof. Re is at least one element selected from La, Ce, Pr, Nd, Sm, Eu, Gd, Tb, Dy, Ho, Er, Tm, Yb, Lu, and Y. M is at least one element selected from Mn, Ni, Co, Fe, Cr, Cu, Mg, Li, Al, Mo, W, and V.

The multilayer body has an electrode facing portion in which the plurality of internal electrode layers face one another with a dielectric layer of the plurality of dielectric layers interposed therebetween, and an external peripheral portion surrounding the electrode facing portion. When the Ti is represented in an amount of 100 parts by mole, the dielectric layer at the electrode facing portion has Si in an amount a of $0.01 \leq a \leq 0.1$, Re in an amount b of $0.1 \leq b \leq 3.0$, and M in an amount c of $0.2 \leq c \leq 5.0$. A ratio m of the amount of Ba to the amount of Ti is $0.965 \leq m \leq 0.990$.

The multilayer electronic component according to the present disclosure can suppress deformation of the dielectric layer at a high temperature and thus ensure high reliability.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Features of the present disclosure will be described with reference to the drawings. In each of the following embodiments of a multilayer electronic component, identical or common components are identically denoted and may not be described repeatedly.

First Embodiment of Multilayer Electronic Component

A multilayer ceramic capacitor 100 showing a first embodiment of a multilayer electronic component according to the present disclosure will be described with reference to FIGS. 1A to 4.

Structure of Multilayer Ceramic Capacitor

Figure 1A:
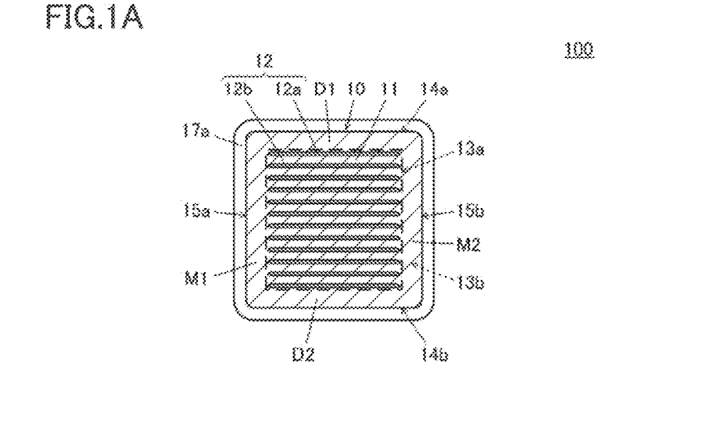
FIG. 1A shows a multilayer ceramic capacitor 100 that is a first embodiment of a multilayer electronic component according to the present disclosure in a cross section of a center portion thereof in its lengthwise direction.
Figure 1B:
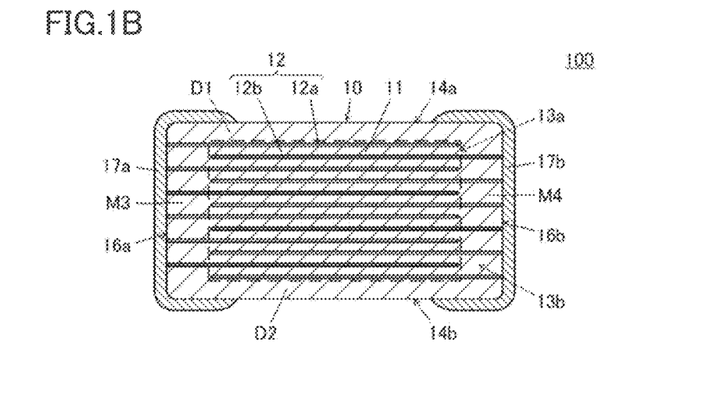
FIG. 1B shows multilayer ceramic capacitor 100 in a cross section of a center portion thereof in its widthwise direction.

A structure of multilayer ceramic capacitor 100 will be described below. FIGS. 1A and 1B are cross sections of multilayer ceramic capacitor 100. Multilayer ceramic capacitor 100 includes a multilayer body 10. Multilayer body 10 includes a plurality of stacked dielectric layers 11 and a plurality of internal electrode layers 12 between adjacent dielectric layers of the plurality of stacked dielectric layers.

Dielectric layers 11 include Ba, Ti, Si, Re, and M as elements thereof. It should be noted that Re is at least one element selected from La, Ce, Pr, Nd, Sm, Eu, Gd, Tb, Dy, Ho, Er, Tm, Yb, Lu, and Y. M is at least one element selected from Mn, Ni, Co, Fe, Cr, Cu, Mg, Li, Al, Mo, W, and V. Dielectric layers 11 have a plurality of crystal grains G including a perovskite-type compound with $BaTiO_3$ as a basic structure (see FIGS. 4A and 4B, which will be described hereinafter).

In dielectric layers 11, Si is present at a grain boundary of crystal grains G, and partially forms a solid solution (not shown) in crystal grains G. Dielectric layer 11 has a fine structure, which will be described hereinafter.

Internal electrode layers 12 can be composed of a conductive material which is at least one type of metal selected from Ni, Ni alloy, Cu, and Cu alloy, or an alloy including the metal. Internal electrode layers 12 may further include dielectric particles referred to as a co-material. The co-material is added in order to make the sintering shrinkability of internal electrode layers 12 close to that of dielectric layers 11 when multilayer body 10 is fired, and it may be any material that can exhibit that effect.

Multilayer body 10 has a first major surface 14a and a second major surface 14b, a first side surface 15a and a second side surface 15b, and a first end surface 16a and a second end surface 16b. First major surface 14a and second major surface 14b are opposite to each other in a layer stacking direction. First side surface 15a and second side surface 15b are opposite to each other in a widthwise direction orthogonal to the layer stacking direction. First end surface 16a and second end surface 16b are opposite to each other in a lengthwise direction orthogonal to the layer stacking direction and the widthwise direction.

That is, FIG. 1A is a cross section of a center portion of multilayer ceramic capacitor 100 in the lengthwise direction. FIG. 1B is a cross section of a center portion of multilayer ceramic capacitor 100 in the widthwise direction.

The plurality of dielectric layers 11 include an outer layer portion and an inner layer portion. The outer layer portion includes a first outer layer portion D1 provided between first major surface 14a of multilayer body 10 and internal electrode layer 12 closest to first major surface 14a, and a second outer layer portion D2 provided between second major surface 14b and internal electrode layer 12 closest to second major surface 14b. The inner layer portion is located in a region sandwiched between first outer layer portion D1 and second outer layer portion D2.

The plurality of internal electrode layers 12 have a first internal electrode layer 12a and a second internal electrode layer 12b. First internal electrode layer 12a has a region facing second internal electrode layer 12b with dielectric layer 11 therebetween, and a lead region reaching first end surface 16a of multilayer body 10. Second internal electrode layer 12b has a region facing first internal electrode layer 12a with dielectric layer 11 therebetween, and a lead region reaching second end surface 16b of multilayer body 10.

In multilayer body 10, a portion in which first internal electrode layer 12a and second internal electrode layer 12b face each other with a dielectric layer 11 interposed therebetween will be referred to as an electrode facing portion 13a (a portion surrounded by a broken line in FIGS. 1A and 1B).

One capacitor is formed by one first internal electrode layer 12a and one second internal electrode layer 12b facing each other with a dielectric layer 11 therebetween. Multilayer ceramic capacitor 100 can be said to be a plurality of capacitors included in electrode facing portion 13a and connected in parallel via a first external electrode 17a and a second external electrode 17b, which will be described hereinafter.

Multilayer body 10 includes a first margin portion M1 provided between electrode facing portion 13a and first side surface 15a and a second margin portion M2 provided between electrode facing portion 13a and second side surface 15b. Multilayer body 10 has a third margin portion M3 provided between electrode facing portion 13a and first end surface 16a, and a fourth margin portion M4 provided between electrode facing portion 13a and second end surface 16b. In third margin portion M3, the lead region of first internal electrode layer 12a is disposed. Further, in fourth margin portion M4, the lead region of second internal electrode layer 12b is disposed.

In multilayer body 10, first and second outer layer portions D1 and D2 and first to fourth margin portions M1 to M4 surrounding electrode facing portion 13a will be referred to as an external peripheral portion 13b.

Multilayer ceramic capacitor 100 further includes first external electrode 17a and second external electrode 17b. First external electrode 17a is formed on first end surface 16a so as to be electrically connected to first internal electrode layers 12a. First external electrode 17a extends from first end surface 16a to first major surface 14a, second major surface 14b, first side surface 15a, and second side surface 15b. Second external electrode 17b is formed on second end surface 16b so as to be electrically connected to second internal electrode layer 12b. Second external electrode 17b extends from second end surface 16b to first major surface 14a, second major surface 14b, first side surface 15a, and second side surface 15b.

First external electrode 17a and second external electrode 17b have an underlying electrode layer and a plating layer disposed on the underlying electrode layer. The underlying electrode layer includes at least one selected from a sintered material layer, an electrically conductive resin layer, a thin film metal layer and a plating layer.

The sintered material layer is formed by baking a paste including a metal powder and a glass powder, and includes a conductive region and an oxide region. The conductive region includes a metal sintered material, which is the above metal powder that is sintered. The metal powder can be at least one selected from Ni, Cu, Ag and the like, or an alloy including the metal. The oxide region includes a glass component derived from the glass powder. The glass powder can be a $B_2O_3$—$SiO_2$—BaO-based glass material or the like.

A plurality of sintered material layers having different components may be formed. The sintered material layer may be fired simultaneously with multilayer body 10 or may be baked after multilayer body 10 is fired.

The electrically conductive resin layer includes electrically conductive particles such as fine metal particles, and a resin portion. The electrically conductive particles can be composed of metal which is at least one type of metal selected from Ni, Cu, Ag and the like, or an alloy including the metal. The resin portion can be composed of resin which is an epoxy-based thermosetting resin or the like. A plurality of electrically conductive resin layers having different components may be formed.

The thin film metal layer is formed by a thin film forming method such as sputtering or vapor deposition, and is a layer having a thickness of 1 μm or less with fine metal particles deposited. The thin film metal layer can be composed of metal which is at least one type of metal selected from Ni, Cu, Ag, Au and the like, or an alloy including the metal. A plurality of thin film metal layers having different components may be formed.

The plating layer as the underlying electrode is provided directly on multilayer body 10 and is connected directly to the internal electrode layer described above. For the plating layer, at least one selected from Cu, Ni, Sn, Au, Ag, Pd, Zn and the like, or an alloy including the metal can be used. For example, when Ni is used as a metal constituting internal electrode layers 12, Cu having good bondability to internal electrode layers 12 is preferably used as the plating layer.

The plating layer disposed on the underlying electrode layer can be composed of metal which is at least one selected from Ni, Cu, Ag, Au, Sn and the like, or an alloy including the metal. A plurality of plating layers having different components may be formed. The plating layer is preferably composed of a Ni plating layer and a Sn plating layer.

The Ni plating layer is disposed on the underlying electrode layer, and can prevent the underlying electrode layer from being eroded by solder when the multilayer electronic component is mounted. The Sn plating layer is disposed on the Ni plating layer. The Sn plating layer has good wettability with solder including Sn, and can improve mountability in mounting the multilayer electronic component. These plating layers are not essential.

Amounts of Elements Included in Dielectric Layer

In multilayer ceramic capacitor 100, when an amount of an element included in a dielectric layer 11 in the electrode facing portion 13a is represented in parts by mole with Ti represented in amount as 100, each element is within the following range:

Si is in an amount a of $0.01 \leq a \leq 0.1$. Re, which is a rare earth element, is in an amount b of $0.1 \leq b \leq 3.0$. It should be noted that Re is at least one element selected from La, Ce, Pr, Nd, Sm, Eu, Gd, Tb, Dy, Ho, Er, Tm, Yb, Lu, and Y. M is in an amount c of $0.2 \leq c \leq 5.0$. M is at least one element selected from Mn, Ni, Co, Fe, Cr, Cu, Mg, Li, Al, Mo, W, and V. A ratio m of the amount of Ba to the amount of Ti is $0.965 \leq m \leq 0.990$.

The amounts of elements included in dielectric layer 11 were determined by polishing away external peripheral portion 13b of multilayer body 10, dissolving electrode facing portion 13a that remains with acid, and analyzing the obtained solution through high-frequency inductively coupled plasma emission spectroscopy (hereinafter also abbreviated as ICP analysis). There is no particular restriction on how electrode facing portion 13a is dissolved to obtain the solution.

In this method, dielectric layer 11 and internal electrode layer 12 are simultaneously dissolved, and accordingly, in the analysis, an element included in internal electrode layer 12 will also be detected in addition to an element included in dielectric layer 11. Therefore, a result of the ICP analysis excluding any element known as being included in internal electrode layer 12 has been regarded as a result of the ICP analysis of a solution obtained by dissolving dielectric layer 11. Further, an element detected as a result thereof and represented in parts by mole is regarded as an amount of an element included in dielectric layer 11.

As has been described above, when a multilayer ceramic capacitor has a dielectric layer including a large amount of Si, the dielectric layer is deformable at a high temperature. As a result, during firing or a heat treatment at a high temperature, the thickness of the dielectric layer may decrease at a location where the internal electrode layer has an increased thickness. On the other hand, when the amount of Si is decreased, a temperature at which the dielectric layer densifies increases. In that case, when the dielectric layer has densified, the thickness of the internal electrode layer is locally further increased, and the thickness of the dielectric layer may further be reduced at a portion where the internal electrode layer has an increased thickness. That is, in order to solve the above problem, it is necessary to suppress an increase of a firing temperature at which the dielectric layer densifies while reducing the amount of Si.

Figure 2:
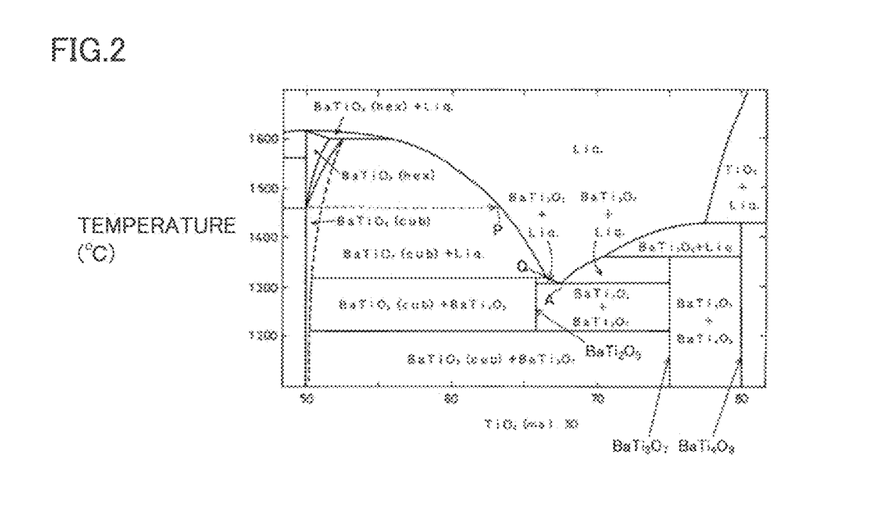
FIG. 2 is a two-dimensional phase diagram of a BaO—$TiO_2$ system.

FIG. 2 is a two-dimensional phase diagram of a BaO—TiO$_2$ system relevant to BaTiO$_3$. In multilayer ceramic capacitor 100, a ratio m of the amount of Ba in dielectric layer 11 to the amount of Ti in dielectric layer 11 is within a range of $0.965 \leq m \leq 0.990$. In that case, as shown in FIG. 2, a compound, such as BaTi$_2$O$_5$, BaTi$_3$O$_7$, and BaTi$_4$O$_9$, having a melting point lower than that of BaTiO$_3$ is produced while multilayer body 10 is fired. The low melting point compound plays a role of a sintering aid, and even when the amount of Si is reduced to the above range, an increase of a firing temperature at which dielectric layer 11 densifies can be suppressed.

Figure 3:
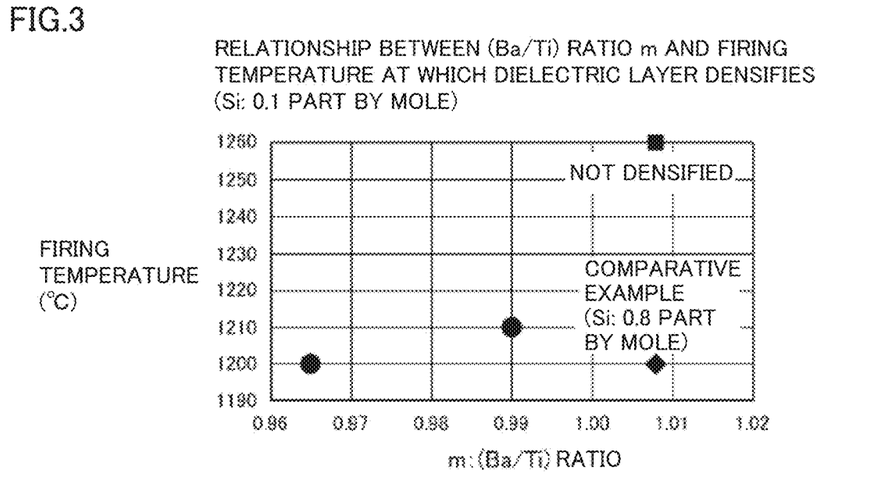
FIG. 3 is a graph representing a relationship between a ratio m of the amount of Ba to the amount of Ti and a firing temperature at which a dielectric layer 11 densifies.

FIG. 3 is a graph showing a relationship between the ratio m of the amount of Ba in dielectric layer 11 to the amount of Ti in dielectric layer 11 and a firing temperature at which dielectric layer 11 densifies. In multilayer ceramic capacitor 100, the amount a of Si in dielectric layer 11 is in a range of $0.01 \leq a \leq 0.1$. The amount of Si in an experiment result shown in the graph of FIG. 3 is 0.1 when each element is represented in parts by mole when Ti is represented in amount of 100 parts by mole. A comparative example in which the amount of Si is 0.8 is also shown.

In order to determine a firing temperature at which the dielectric layer densifies for each composition, a single dielectric plate without including the internal electrode layer was prepared, and a relationship between firing temperature and apparent density was examined. A lowest temperature in a temperature range in which a substantial change in apparent density with respect to firing temperature was no longer observed was regarded as a firing temperature at which the dielectric layer densifies.

Looking at this, when the amount of Si is 0.8, the dielectric layer densifies at 1200° C. even for a ratio m of 1.008. In that case, however, the dielectric layer may be deformable at a high temperature. In contrast, when the amount of Si is reduced to 0.1 in order to suppress deformation of the dielectric layer at a high temperature, the dielectric layer does not densify at 1260° C. for a ratio m of 1.008. It is believed that this is because the amount of Ba is larger than the amount of Ti, so that the low melting point compound is less likely to be produced.

However, by setting the ratio m within the above-described range and facilitating the production of the low melting point compound, the dielectric layer densifies at 1200° C. to 1210° C., which is equivalent to that for the case in which the amount of Si is 0.8. It has been separately confirmed that even when the amount of Si is reduced to 0.01, setting the ratio m within the above range allows the dielectric layer to densify at a firing temperature up to 1250° C.

In multilayer ceramic capacitor 100, the amount b of Re (the types of the elements thereof have been described above) in dielectric layer 11 is within a range of $0.1 \le b \le 3.0$. The amount c of M (the types of the elements thereof have been described above) is within a range of $0.2 \le c \le 5.0$.

When at least one metal selected from Ni, a Ni alloy, Cu and a Cu alloy or an alloy including the metal is used as a material for internal electrode layer 12, multilayer body 10 needs to be fired in a reducing atmosphere. In contrast, when the ratio m of the amount of Ba in the dielectric layer to the amount of Ti in the dielectric layer is 1.000 or less and Re as a rare earth element is included in the dielectric layer, the dielectric layer may be reduced during firing and insulation resistance may decrease.

In order to improve a multilayer ceramic capacitor comprising a dielectric layer including $BaTiO_3$ in reliability, it is necessary to suppress movement of oxygen vacancies in the dielectric layer when DC voltage is applied. In order to improve reliability, replacing $Ba^{2+}$ that is a positive divalent ion of Ba in the crystal lattice of $BaTiO_3$ with $Re^{3+}$ that is a positive trivalent ion of a rare earth element Re is considered to be effective. (Hereinafter, when ion is denoted, it may be denoted as described above).

Replacing $Ba^{2+}$ with $Re^{3+}$, as described above, results in an excessive positive charge. Therefore, Ba vacancies which are considered to be relatively negatively divalently charged are generated so as to satisfy an electrically neutral condition. The Ba vacancies form stable vacancy pairs with oxygen vacancies that can be regarded as being relatively positively divalently charged. The Ba vacancies do not easily move even when DC voltage is applied, and the oxygen vacancies captured by the Ba vacancies also do not move easily.

Multilayer ceramic capacitor 100 includes Re and M that are the above-described elements and within the above-described ranges, and, while having the ratio m in a range of $0.965 \le m \le 0.990$, can suppress reduction in insulation resistance and ensures high reliability.

For example, in multilayer ceramic capacitor 100, dielectric layers 11 include Si in an amount of 0.1, Re as Dy in an amount of 1.0, and Mg, Mn and V as M in amounts of 0.3, 0.1 and 0.05, respectively, and has a ratio m of 0.990 for the sake of illustration. Further, multilayer ceramic capacitor 100 has an external dimension set to 1.6 mm in length and 0.8 mm in width, dielectric layer 11 has a thickness set to 0.5 µm, and internal electrode layers 12 are 300 internal electrode layers 12 for the sake of illustration.

In that case, breakdown voltage was 40 V or more, and a mean time to failure in highly accelerated life testing in which a DC voltage of 4 V was applied at a temperature of 150° C. was 100 hours or more. The mean time to failure is adopted as an index for reliability, and can be measured for example through the following procedure:

That is, highly accelerated life testing in which a DC voltage of 4 V is applied at a temperature of 150° C. is performed, and how the resistance values vary with time is measured. An electric field intensity applied to dielectric layer 11 will be 8 kV/mm when dielectric layer 11 has a thickness of 0.5 µm. For 100 multilayer ceramic capacitors, a time when a resistance value becomes 1 MΩ or less is determined as a time to failure, and from a Weibull analysis of such times to failure, a mean time to failure is determined.

Multilayer ceramic capacitor 100 has high reliability, that is, a breakdown voltage of 40 V or more and a mean time to failure of 100 hours or more in the highly accelerated life testing under the above conditions. That is, multilayer ceramic capacitor 100 can suppress deformation of the dielectric layer at a high temperature, and can ensure high reliability.

In multilayer ceramic capacitor 100, dielectric layer 11 preferably has the following feature. That is, dielectric layer 11 in electrode facing portion 13a has an average thickness ta of 0.5 µm or less. A ratio n of a median diameter of the plurality of crystal grains G constituting dielectric layer 11 in electrode facing portion 13a to the average thickness ta of dielectric layer 11 is $0.14 \le n \le 0.8$. Furthermore, a variation coefficient CV representing a variation in thickness t of dielectric layer 11 in electrode facing portion 13a is preferably 15% or less, and in addition, it is more preferable when dielectric layer 11 has the above feature.

Figure 4A:
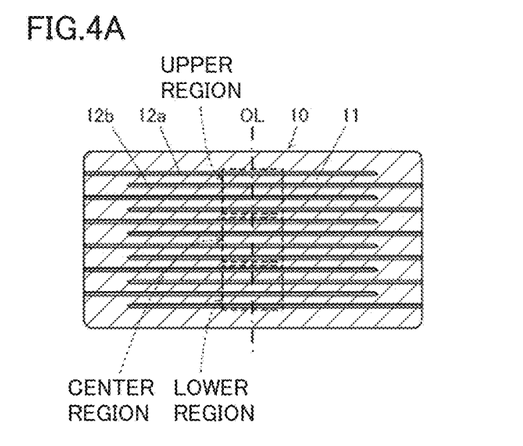
FIG. 4A shows a sample prepared for examining an average thickness ta of dielectric layer 11 and a variation coefficient CV of a thickness t thereof, in a cross section of a center portion thereof in its lengthwise direction
Figure 4B:
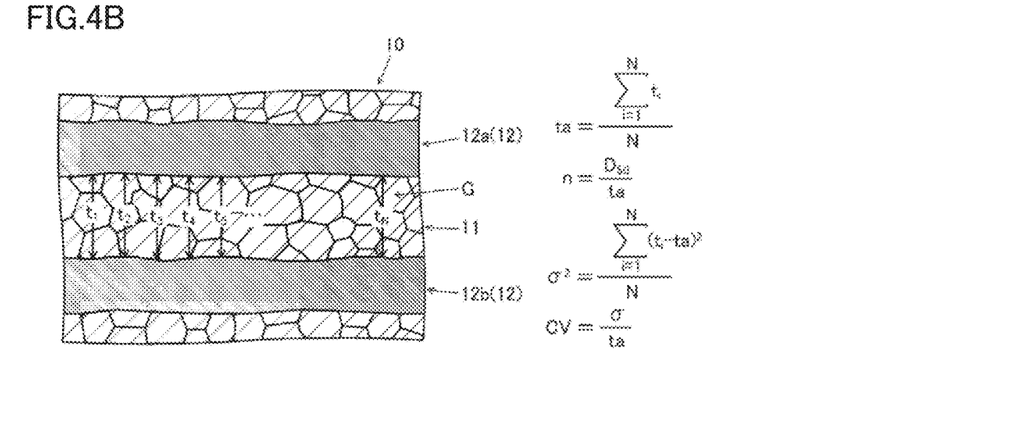
FIG. 4B is a schematic diagram of an image observed with a scanning electron microscope (hereinafter also abbreviated as SEM) in the center region shown in FIG. 4A for examining the average thickness ta of dielectric layer 11, the variation coefficient CV of the thickness t, and a median diameter of a plurality of crystal grains G.

FIGS. 4A and 4B are diagrams for illustration for examining the average thickness ta of dielectric layer 11, the variation coefficient CV of the thickness t, and the median diameter of the plurality of crystal grains G. FIG. 4A is a cross section of a center portion of a prepared sample in the lengthwise direction. FIG. 4B is a schematic diagram of an SEM observed image in the center region of FIG. 4A for illustrating a method for examining the above numerical values.

The average thickness ta of dielectric layer 11 can be measured as follows: First, polishing was performed to a depth of about ½ in the widthwise direction to expose a cross section (a plane shown in FIG. 4A) defined by the length and thickness of multilayer body 10. In order to eliminate extension of internal electrode layer 12 caused by polishing, the cross section was processed by ion milling.

For the resulting polished multilayer body, as shown in FIG. 4A, an imaginary line OL orthogonal to internal electrode layer 12 was assumed in a vicinity of the center portion of the cross section in the lengthwise direction. Then, along the imaginary line OL, a region which is composed of a stack of dielectric layer 11, first internal electrode layer 12a and second internal electrode layer 12b and involved in obtaining electrostatic capacitance for the polished body was divided into three equal parts in the layer stacking direction, and thus divided into three regions of an upper region, a center region, and a lower region.

The thickness t of dielectric layer 11 was determined by performing an image analysis of an SEM observed image at a center portion of each region on the imaginary line OL. Note that the thickness t was measured except for each region at an outermost dielectric layer 11 and a portion where two or more dielectric layers 11 were observed to be connected together due to a defect of internal electrode layer 12.

As shown in FIG. 4B, the average thickness ta of dielectric layer 11 can be determined as an arithmetic mean of thicknesses t at a plurality of locations (10 locations or more) in dielectric layer 11. The variation coefficient CV representing a variation in thickness t of dielectric layer 11 is determined by dividing a standard deviation σ of measured values (at 10 points or more) in thickness of dielectric layer 11 by the average thickness ta of dielectric layer 11.

The median diameter of the plurality of crystal grains G constituting dielectric layer 11 in electrode facing portion 13a can be determined from a cumulative distribution in percentage of diameters of the crystal grains G as each converted into an equivalent circle, as obtained through an image analysis of an SEM observed image. The median diameter of the crystal grains G refers to a grain diameter corresponding to a cumulative % of 50% in the profile of the cumulative distribution in percentage of the grain diameters (D50).

When a ratio n of the median diameter of the plurality of crystal grains G to the average thickness ta of dielectric layer 11 is $0.14 \leq n \leq 0.8$, deformation of the dielectric layer at a high temperature can be suppressed, and in addition, higher reliability can be ensured as the crystal grains are made fine. This is obtained as a significant effect when the average thickness ta of dielectric layer 11 is 0.5 μm or less.

When the variation coefficient CV representing a variation in thickness t of dielectric layer 11 in electrode facing portion 13a is 15% or less, it reliably suppresses variation in thickness of dielectric layer 11, formation of a portion having a reduced thickness, in particular. Therefore, in addition to suppressing deformation of the dielectric layer at a high temperature, a local increase in electric field intensity can be suppressed, and further higher reliability can be ensured.

Second Embodiment of Multilayer Electronic Component

A multilayer ceramic capacitor 100A showing a second embodiment of the multilayer electronic component according to the present disclosure will be described with reference to FIG. 5. Multilayer ceramic capacitor 100A is what further illustrates a feature of external peripheral portion 13b. Electrode facing portion 13a has the same feature as has been described for multilayer ceramic capacitor 100, and accordingly, will not be described repeatedly.

In multilayer ceramic capacitor 100A, first external electrode 17a includes a sintered material layer 17a₁ having a conductor region and an oxide region including Si, and a plating layer 17a₂ disposed on sintered material layer 17a₁. Similarly, second external electrode 17b includes a sintered material layer 17b₁ and a plating layer 17b₂ disposed on sintered material layer 17b₁. Each plating layer is not essential. First external electrode 17a and second external electrode 17b are formed at the same positions as those for multilayer ceramic capacitor 100.

An average value d of an amount of Si in the external peripheral portion 13b at a region thereof having a thickness of 10 μm and in contact with each sintered material layer of each external electrode is, when the Ti is represented in amount as 100 parts by mole, $5 \leq d$.

A method for investigating the amount of Si in multilayer ceramic capacitor 100A at a region located in external peripheral portion 13b in contact with second external electrode 17b will be described. FIG. 5A is a top view of multilayer ceramic capacitor 100A showing first major surface 14a of multilayer body 10A. FIG. 5B is a side view thereof showing first side surface 15a of multilayer body 10A. FIG. 5C is a front view thereof showing second end surface 16b of multilayer body 10A.

Figure 5A:
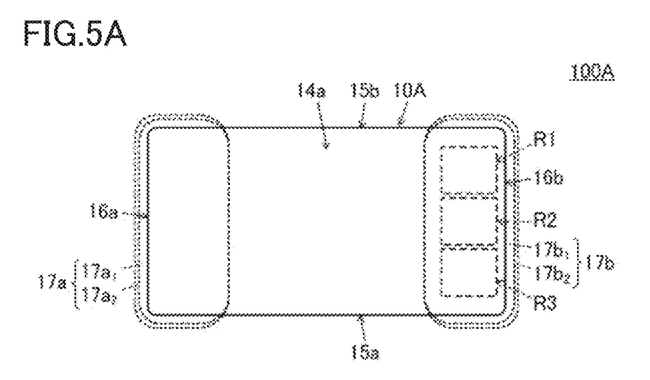
FIG. 5A is a top view showing a first major surface 14a of a multilayer body 10A of a multilayer ceramic capacitor 100A that is a second embodiment of the multilayer electronic component according to the present disclosure.
Figure 5B:
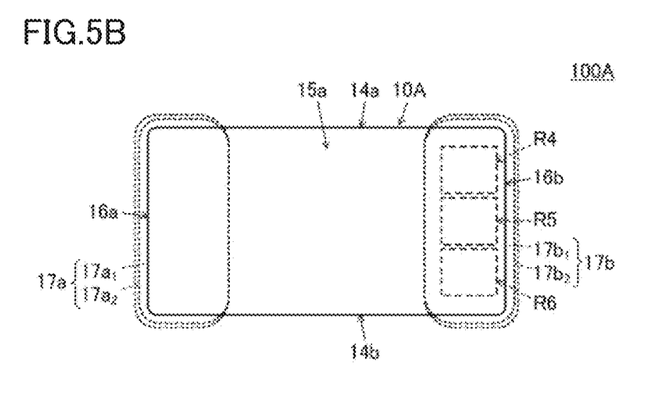
FIG. 5B is a side view showing a first side surface 15a of multilayer body 10A.
Figure 5C:
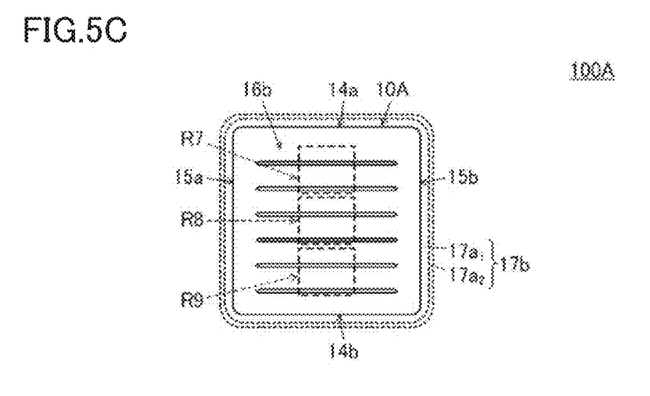
FIG. 5C is a front view showing a second end surface 16b of multilayer body 10A.

In first major surface 14a of multilayer body 10, three regions R1 to R3 which are located at positions shown in FIG. 5A in contact with sintered material layer 17b₁ are set as observation regions on the side of the major surface. In addition, in first side surface 15a of multilayer body 10, three regions R4 to R6 which are located at positions shown in FIG. 5B in contact with sintered material layer 17b₁ are set as observation regions on the side of the side surface. Further, in second end surface 16b of multilayer body 10, three regions R7 to R9 which are located at positions shown in FIG. 5C in contact with sintered material layer 17b₁ are set as observation regions on the side of the end surface.

Nine samples exposing a cross section of multilayer body 10 are prepared so that, in a predetermined region including a center portion of each observation region of multilayer body 10 set as described above, a composition analysis can be done in a depthwise direction from a surface of external peripheral portion 13b. Each obtained sample is subjected to an elemental analysis through wavelength dispersive X-ray analysis (hereinafter also abbreviated as WDX analysis). The WDX analysis is conducted in the predetermined region including the center portion of each observation region and a predetermined region including a center portion of electrode facing portion 13a in a sample prepared for analyzing region R2.

Then, an average value d in an amount of Si in a region including the center portion of each observation region and having a thickness of 10 μm from a surface of external peripheral portion 13b and an amount a of Si in the region including the center portion of electrode facing portion 13a, as obtained through the above composition analysis, are compared with each other.

In multilayer ceramic capacitor 100A, it has been confirmed that in any of the nine samples, the average value d in amount of Si in the region having a thickness of 10 μm from the surface of external peripheral portion 13b and the amount a of Si in the region including the center portion of electrode facing portion 13a satisfy $5a \leq d$. It is inferred that this is also achieved in other regions of external peripheral portion 13b in contact with the sintered material layer of each external electrode as a matter of course.

This is relevant to the fact that the sintered material layer of each external electrode is formed on multilayer body 10 by baking a paste including metal powder and glass powder including Si. That is, during the baking, Si in the glass powder partially diffuses from a surface of external peripheral portion 13b that is in contact with the paste in the depthwise direction and therearound. As has been described above, an amount of Si in multilayer body 10 according to the present disclosure is smaller than conventional, and as a result, the amount a of Si in electrode facing portion 13a and the region of external peripheral portion 13b in contact with the sintered material layer of each external electrode satisfy the above-described relationship.

When the amount of Si in multilayer body 10 satisfies the above-described relationship, the region of external peripheral portion 13b in contact with the sintered material layer of each external electrode and the sintered material layer are firmly bonded together from the above-described formation process, and formation of a gap at their interface is suppressed. Therefore, multilayer ceramic capacitor 100A ensures high reliability by suppressing deformation of the dielectric layer at high temperature, and in addition, can enhance moisture resistance.

Method for Manufacturing Multilayer Electronic Component

A method for manufacturing multilayer ceramic capacitor 100 showing an embodiment of the multilayer electronic component according to the present disclosure will be described in the order of manufacturing steps. The method for manufacturing multilayer ceramic capacitor 100 includes the following steps.

The method for manufacturing multilayer ceramic capacitor 100 includes the step of obtaining a plurality of ceramic green sheets by using $BaTiO_3$ powder having a surface with a variety of types of additives added thereto (or dielectric raw material powder). The word "green" is an expression representing "pre-sintered" and will be used in that meaning hereinafter. The ceramic green sheet includes a binder component other than the dielectric raw material powder. The binder component is not particularly limited.

The additives include Si, Re, and M as elements. It should be noted that Re is at least one element selected from La, Ce, Pr, Nd, Sm, Eu, Gd, Tb, Dy, Ho, Er, Tm, Yb, Lu and Y, and M is at least one element selected from Mn, Ni, Co, Fe, Cr, Cu, Mg, Li, Al, Mo, W and V.

The above-described dielectric raw material powder can be produced, for example, by applying an organic compound of an additive to a surface of $BaTiO_3$ powder, and calcinating and burning the organic component to thereby bring about a state in which the additive is applied to the surface of the $BaTiO_3$ powder in an oxide state. However, the dielectric raw material powder is not limited to the above-described state, and may be in a state of an organic compound or a state of a mixture of an oxide and an organic compound.

The $BaTiO_3$ powder can be obtained, for example, by calcinating a mixture of a $BaCO_3$ powder and a $TiO_2$ powder. Alternatively, a $BaTiO_3$ powder made in a known method such as an oxalic acid method or a hydrothermal synthesis method may be used.

The method for manufacturing multilayer ceramic capacitor 100 includes the step of forming an internal electrode layer pattern on a ceramic green sheet for example by printing an internal electrode layer paste. The internal electrode layer paste includes metal powder including one of Ni, a Ni alloy, Cu and a Cu alloy, $BaTiO_3$ powder having a surface with a variety of additives added thereto (i.e., a co-material), and a binder component. The binder component is not particularly limited. Note that the co-material is not essential.

The co-material can be prepared for example as follows: An additive of an organic compound is provided to a surface of $BaTiO_3$ powder and calcinated to combust an organic component so that the additive is provided to the surface of the $BaTiO_3$ powder in the form of an oxide. Note, however, that this is not exclusive, and the co-material may be in a state of an organic compound or may be in a state of a mixture of an oxide and an organic compound. Further, the $BaTiO_3$ powder may be replaced with $BaTiO_3$ solid solution powder. The co-material may be the same as or different from the dielectric raw material powder. Note that the internal electrode layer pattern may be formed in a method other than printing the internal electrode layer paste, as describes above.

The method for manufacturing multilayer ceramic capacitor 100 includes the step of stacking a plurality of ceramic green sheets including a ceramic green sheet with an internal electrode pattern formed thereon to obtain a green multilayer body.

The method for manufacturing multilayer ceramic capacitor 100 includes the step of sintering the green multilayer body to obtain a multilayer body including a plurality of stacked dielectric layers and a plurality of internal electrode layers. In the sintering step, for example, a temperature of 800° C. may rapidly be raised at a rate of 1° C./sec or more and 100° C./sec or less to a maximum temperature at which the multilayer body is sintered. The obtained multilayer body may be subjected to a heat treatment at 800° C. or higher and 1200° C. or lower.

The embodiments disclosed herein are illustrative and the invention according to the present disclosure is not limited to the above-described embodiments. That is, the scope of the invention according to the present disclosure is defined by the terms of the claims, and is intended to include any modifications within the scope and meaning equivalent to the terms of the claims. Various variations and modifications are also possible within the above-described scope.

For example, various variations and modifications are possible within the scope of the present invention in terms for example of the number of and material(s) for dielectric layers forming the multilayer body and the number of and material(s) for internal electrode layers forming the multilayer body. Although a multilayer ceramic capacitor has been described as an example of the multilayer electronic component, the invention according to the present disclosure is not limited thereto and is also applicable for example to a capacitor element formed within a multilayer substrate.

What is claimed is:

1. A multilayer electronic component comprising:
   a multilayer body including a plurality of stacked dielectric layers and a plurality of internal electrode layers between adjacent dielectric layers of the plurality of stacked dielectric layers, the multilayer body having an electrode facing portion in which the plurality of internal electrode layers face one another with a dielectric layer of the plurality of dielectric layers interposed therebetween, and the multilayer body having an external peripheral portion surrounding the electrode facing portion, wherein
      each dielectric layer of the plurality of dielectric include, as elements, Ba, Ti, Si, Re, and M, where
      the Re is at least one element selected from La, Ce, Pr, Nd, Sm, Eu, Gd, Tb, Dy, Ho, Er, Tm, Yb, Lu, and Y,
      the M is at least one element selected from Mn, Ni, Co, Fe, Cr, Cu, Mg, Li, Al, Mo, W, and V, and
      when the Ti is represented in an amount of 100 parts by mole, the dielectric layer at the electrode facing portion has:
         the Si in an amount a of $0.01 \leq a \leq 0.1$,
         the Re in an amount b of $0.1 \leq b \leq 3.0$,
         the M in an amount c of $0.2 \leq c \leq 5.0$, and
         a ratio m of an amount of the Ba to an amount of the Ti of $0.965 \leq m \leq 0.990$; and
   an external electrode on the external peripheral portion and electrically connected to some of the plurality of internal electrode layers, wherein
      the external electrode includes a sintered material layer having a conductor region and an oxide region including Si, and
      when the Ti is represented in an amount of 100 parts by mole, a region of the dielectric layer at the external peripheral portion having a thickness of 10 µm from a surface of the external peripheral portion and in contact with the sintered material layer has an average valued d in an amount of the Si of $5a \leq d$.

2. The multilayer electronic component according to claim 1, wherein
   the dielectric layer in the electrode facing portion has an average thickness ta of 0.5 µm or less, and a ratio n of a median diameter of a plurality of crystal grains of the dielectric layer in the electrode facing portion to the average thickness ta is $0.14 \leq n \leq 0.8$.

3. The multilayer electronic component according to claim 2, wherein a variation coefficient CV represented a variation in thickness of the dielectric layer in the electrode facing portion is 15% or less.

4. The multilayer electronic component according to claim 1, wherein a variation coefficient CV representing a variation in thickness of the dielectric layer in the electrode facing portion is 15% or less.

5. The multilayer electronic component according to claim 1, wherein the dielectric layer in the electrode facing portion has an average thickness ta of 0.5 μm or less.

6. The multilayer electronic component according to claim 5, wherein a variation coefficient CV representing a variation in thickness of the dielectric layer in the electrode facing portion is 15% or less.

7. A multilayer electronic component comprising:
a multilayer body including a plurality of stacked dielectric layers and a plurality of internal electrode layers between adjacent dielectric layers of the plurality of stacked dielectric layers, the multilayer body having an electrode facing portion in which the plurality of internal electrode layers face one another with a dielectric layer of the plurality of dielectric layers interposed therebetween, and the multilayer body having an external peripheral portion surrounding the electrode facing portion, wherein
each dielectric layer of the plurality of dielectric include, as elements, Ba, Ti, Si, Re, and M, where
the Re is at least one element selected from La, Ce, Pr, Nd, Sm, Eu, Gd, Tb, Dy, Ho, Er, Tm, Yb, Lu, and Y,
the M is at least one element selected from Mn, Ni, Co, Fe, Cr, Cu, Mg, Li, Al, Mo, W, and V, and
when the Ti is represented in an amount of 100 parts by mole, the dielectric layer at the electrode facing portion has:
the Si in an amount a of $0.01 \leq a \leq 0.1$,
the Re in an amount b of $0.1 \leq b \leq 3.0$,
the M in an amount c of $0.2 \leq c \leq 5.0$, and
a ratio m of an amount of the Ba to an amount of the Ti of $0.965 \leq m \leq 0.990$,
a first external electrode on a first part of the external peripheral portion and electrically connected to a first set of internal electrode layers of the plurality of internal electrode layers; and
a second external electrode on a second part of the external peripheral portion and electrically connected to a second set of internal electrode layers of the plurality of internal electrode layers, wherein
the first and second external electrodes include a sintered material layer having a conductor region and an oxide region including Si, and
when the Ti is represented in an amount of 100 parts by mole, a region of the dielectric layer at the external peripheral portion having a thickness of 10 μm from a surface of the external peripheral portion and in contact with the sintered material layer has an average valued in an amount of the Si of $5a \leq d$.

8. The multilayer electronic component according to claim 7, wherein
the dielectric layer in the electrode facing portion has an average thickness ta of 0.5 μm or less, and
a ratio n of a median diameter of a plurality of crystal grains of the dielectric layer in the electrode facing portion to the average thickness ta is $0.14 \leq n \leq 0.8$.

9. The multilayer electronic component according to claim 8, wherein a variation coefficient CV representing a variation in thickness of the dielectric layer in the electrode facing portion is 15% or less.

10. The multilayer electronic component according to claim 7, wherein a variation coefficient CV representing a variation in thickness of the dielectric layer in the electrode facing portion is 15% or less.

11. The multilayer electronic component according to claim 7, wherein the dielectric layer in the electrode facing portion has an average thickness to of 0.5 μm or less.

12. The multilayer electronic component according to claim 11, wherein a variation coefficient CV representing a variation in thickness of the dielectric layer in the electrode facing portion is 15% or less.

* * * * *